(12) United States Patent
Uitenbroek

(10) Patent No.: US 7,734,409 B2
(45) Date of Patent: Jun. 8, 2010

(54) METHOD AND APPARATUS FOR CONTROLLING AN AIR-FUEL MIXTURE

(75) Inventor: Paul Uitenbroek, Kohlscheid (DE)

(73) Assignee: Nonox BV, KC Hoensbroek (NL)

( * ) Notice: Subject to any disclaimer, the term of this patent is extended or adjusted under 35 U.S.C. 154(b) by 303 days.

(21) Appl. No.: 11/887,479

(22) PCT Filed: Apr. 25, 2005

(86) PCT No.: PCT/EP2005/004424

§ 371 (c)(1),
(2), (4) Date: Sep. 28, 2007

(87) PCT Pub. No.: WO2006/102924

PCT Pub. Date: Oct. 5, 2006

(65) Prior Publication Data

US 2009/0143955 A1      Jun. 4, 2009

(30) Foreign Application Priority Data

Mar. 31, 2005   (DE)   ........................ 10 2005 014 789

(51) Int. Cl.
*F02D 41/00* (2006.01)

(52) U.S. Cl. ...................... 701/103; 123/527

(58) Field of Classification Search ......... 701/101–105, 701/110, 115; 60/612; 123/336, 337, 347, 123/348, 399, 403, 443, 527, 562, 568.14, 123/691, 692

See application file for complete search history.

(56) References Cited

U.S. PATENT DOCUMENTS

| | | | |
|---|---|---|---|
| 4,086,885 A | 5/1978 | Noguchi et al. | |
| 4,455,984 A * | 6/1984 | Merlini et al. | 123/481 |
| 4,867,127 A | 9/1989 | Quirchmayr et al. | |
| 5,167,211 A * | 12/1992 | Fukuma et al. | 123/308 |
| 5,647,312 A | 7/1997 | Salber et al. | |
| 6,003,307 A | 12/1999 | Naber et al. | |
| 6,129,069 A | 10/2000 | Uitenbroek | |
| 6,155,229 A * | 12/2000 | Cantrell, Jr. et al. | 123/336 |
| 6,360,719 B1 | 3/2002 | Uitenbroek | |
| 6,941,905 B2 * | 9/2005 | Hitomi et al. | 123/58.8 |
| 6,953,029 B2 | 10/2005 | Uitenbroek | |
| 6,978,204 B2 * | 12/2005 | Surnilla et al. | 701/103 |
| 7,028,678 B2 * | 4/2006 | Betz et al. | 123/562 |
| 7,165,389 B2 * | 1/2007 | Kamoto et al. | 60/274 |
| 7,246,485 B2 * | 7/2007 | Ohki et al. | 60/285 |
| 7,269,495 B2 * | 9/2007 | Katsumata | 701/103 |

(Continued)

FOREIGN PATENT DOCUMENTS

JP        10-47166        2/1998

(Continued)

*Primary Examiner*—Willis R. Wolfe, Jr.
*Assistant Examiner*—Johnny H Hoang
(74) *Attorney, Agent, or Firm*—J-Tek Law PLLC; Jeffrey D. Tekanic

(57) ABSTRACT

In a method for controlling the composition of a combustible air-fuel mixture present in a combustion chamber of a spark-ignited internal combustion engine having external mixture formation, at least two fluids containing air are generated, of which at least one is an air-fuel mixture; the fluids are supplied to the combustion chamber, wherein the quantity proportions of the fluids are controlled such that their total composition corresponds to the predetermined composition.

20 Claims, 2 Drawing Sheets

U.S. PATENT DOCUMENTS

| | | |
|---|---|---|
| 7,293,404 B2 * | 11/2007 | Enoki et al. .................... 60/277 |
| 7,305,977 B1 * | 12/2007 | Stroh ......................... 123/679 |
| 2002/0038541 A1 * | 4/2002 | Sumilla et al. ................ 60/274 |
| 2003/0196641 A1 | 10/2003 | Ashida et al. |
| 2004/0060527 A1 * | 4/2004 | Hitomi et al. .............. 123/58.8 |

FOREIGN PATENT DOCUMENTS

| | | |
|---|---|---|
| WO | WO 99/58826 A | 11/1999 |

* cited by examiner

US 7,734,409 B2

1

METHOD AND APPARATUS FOR CONTROLLING AN AIR-FUEL MIXTURE

CROSS REFERENCE

This application is the U.S. national stage filing of International Application No. PCT/EP2005/004424 filed Apr. 25, 2005, which claims priority to German patent application no. 10 2005 014 789.5 filed Mar. 31, 2005.

TECHNICAL FIELD

The invention concerns a method for controlling the composition of the combustible air-fuel mixture present in a combustion chamber of a spark-ignited internal combustion engine having external mixture formation. The invention further concerns a device for performing such a method.

BACKGROUND ART

The composition of the combustible air-fuel mixture in the combustion chamber is of decisive importance for fuel consumption as well as for the pollutant content of the exhaust gas. Precise controlling of the mixture formation is very important, especially for internal combustion engines tuned for lean operation. The following fuel metering methods are known and usable for internal combustion engines having external mixture formation:

The fuel metering can take place in a cylinder-selective manner by feeding the fuel into individual intake pipes leading to the individual cylinders by means of fuel injection values disposed close to the intake valves. These fuel injection valves usually function such that they can be switched between two positions—valve "fully open" and valve "fully closed"—and the injected fuel quantity is changed exclusively by manipulating the time duration of the opening as well as, if desired, by manipulating the phase position of this opening relative to the phase position of the opening of the intrinsic intake valve. As a result, it can rapidly respond to varying quantity demands, i.e. the system operates highly dynamically. Due to the fact that the mixture mass flowing into the cylinder proceeds as a function in accordance with the piston movement, which piston movement is predetermined by the crankshaft design, the fuel mass flow remains constant at a constant load, but a relatively inhomogeneous mixture composition results inside the combustion chamber. At the lean operating limit, this leads in particular to large standard deviations in the cylinder mean effective pressure and to high NOx-emissions.

In the other fuel metering methods, the fuel metering takes place remotely in a manner centrally for all cylinders and relatively far from the intrinsic intake valves. Consequently, a buffer volume exists between the fuel metering location and the intake valves, whereby a good homogeneity of the inflowing air-fuel mixture is in fact achieved, but wherein the dynamic capability is restricted due to the long way between the fuel metering location and the intake valves, i.e. the composition of the inflowing air-fuel mixture can be adapted to the varying demands only with a certain lag.

SUMMARY OF THE INVENTION

The object underlying the invention is to provide a possibility, with which the composition of the combustible air-fuel mixture present in the combustion chamber of a spark-ignited internal combustion engine having external mixture formation can be adapted to varying demands as precisely and/or as quickly as possible.

2

In one aspect of the present teachings, a method is disclosed for controlling the composition of the combustible air-fuel mixture present in a combustion chamber of a spark-ignited internal combustion engine having external mixture formation, such that the mixture has a predetermined composition. In this method, at least two fluids containing air are generated, of which at least one is an air-fuel mixture and the fluids are supplied to the combustion chamber. The quantity proportions of the fluids are controlled such that their total composition corresponds to the predetermined composition.

Preferably, the quantity control of the fluids supplied to the combustion chamber first takes place either shortly before their entrance into the combustion chamber or upon their entrance into the combustion chamber. In addition or in the alternative, one fluid is preferably a rich air-fuel mixture and the other fluid is preferably a lean air-fuel mixture, wherein the rich air-fuel mixture has a higher fuel content than the mixture having the predetermined composition and the lean air-fuel mixture has a lower fuel content than the mixture having the predetermined composition.

In another aspect of the present teachings, an apparatus is disclosed for controlling the composition of a combustible air-fuel mixture present in a combustion chamber of a spark-ignited internal combustion engine having external mixture formation, so that the mixture has a predetermined composition. The apparatus preferably comprises a first mixture generating device for generating a rich mixture and a second mixture generating device for generating a lean mixture. Preferably, both mixtures are generated by adding fuel to fresh air, which is supplied to the combustion engine, the rich mixture having a higher fuel proportion than the mixture having the predetermined composition and the lean mixture having a lower fuel proportion than the mixture having the predetermined composition. A first device is provided for supplying the rich mixture to a first intake leading into a combustion chamber of the internal combustion engine and a second device is provided for supplying the lean mixture to a second intake leading into a combustion chamber of the internal combustion engine. A first valve device operates in the first intake and controls the quantity of the rich mixture supplied to the combustion chamber. A second valve device operates in the second intake and controls the quantity of the lean mixture supplied to the combustion chamber. A control device is provided for controlling the valve devices such that the sum of the quantities of the rich mixture and the lean mixture flowing into the combustion chamber results in a mixture having the predetermined composition.

The invention is particularly suited for supercharged gas engines, i.e. for engines, to which a compressed fresh air charge and/or a compressed mixture of fresh air and fuel is supplied.

BRIEF DESCRIPTION OF THE DRAWINGS

The invention will be explained in an exemplary manner and in further detail in the following with the assistance of schematic drawings.

In the Figures.

DETAILED DESCRIPTION OF THE INVENTION

Figure 1:
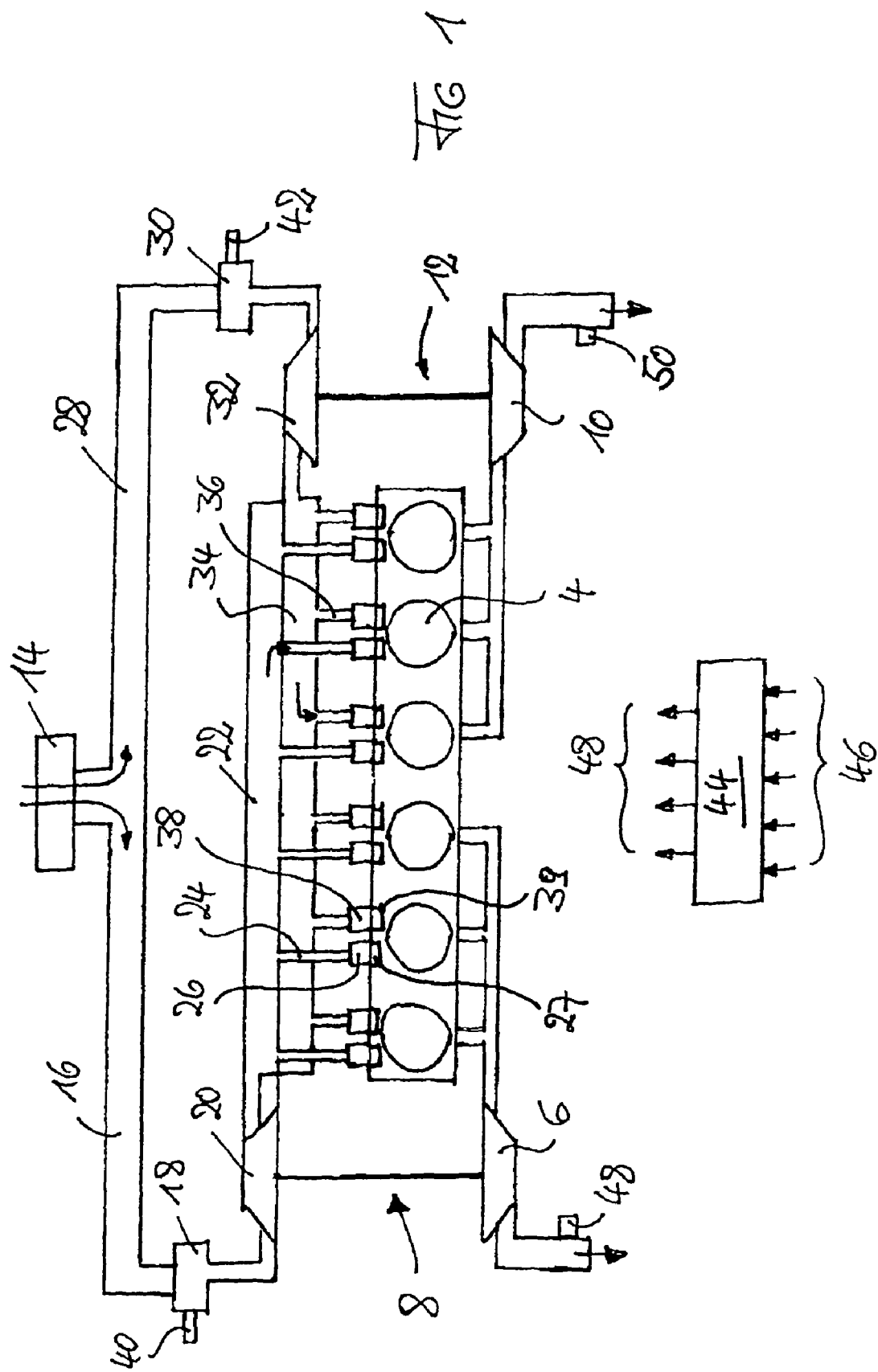
FIG. 1 shows a principle view of an inventive, multi-cylinder, reciprocating-piston internal combustion engine

According to FIG. 1, the exemplary-illustrated, reciprocating-piston internal combustion engine includes six cylinders 4 arranged in a row, each of which has two intake valves 27 and 39, which are commonly operated by camshafts (not shown), and a not-illustrated exhaust valve.

Exhaust gas conduits of the three cylinders 4 on the left side according to FIG. 1 lead to an exhaust gas turbine 6 of a first exhaust gas turbocharger 8. Exhaust gas conduits of the three cylinders 4 on the right side according to FIG. 1 lead to an exhaust gas turbine 10 of a second exhaust gas turbocharger 12.

A first conduit 16 leads from an air filter 14 through a first fuel metering device 18 into a supercharger turbine 20 of the exhaust gas turbocharger 8. The output of the supercharger turbine 20 leads into a first manifold 22, from which individual intake pipes 24 lead through respective control valves 26 to an inlet into the respective cylinder; an intake valve 27, normally formed as a plate valve and/or as a charge change valve, operates in the cylinder in a known manner.

Another conduit 28 leads from the air filter 14 through a fuel metering device 30 to the supercharger turbine 32 of the exhaust turbocharger 12. The output of the supercharger turbine 32 is connected with another manifold 34, from which individual intake pipes 36 lead through respective control valves 38 to the respective other intake of a respective cylinder 4, in which the other intake valve 39 operates.

A fuel metering valve 40, 42, respectively, is disposed in each of the fuel metering devices 18 and 30; fuel is supplied to the fresh air, which is flowing through the fuel metering device, by means of the valve 40, 42, respectively, in an amount that depends upon the air flow rate, such that a predetermined air-fuel ratio is present downstream of the respective fuel metering device 18, 30, respectively. Such fuel metering devices are generally known and thus will not be explained herein. The air flow rate (quantity flow rate) is measured and the respective fuel metering valve 40, 42 is controlled such that a corresponding fuel quantity is metered dependent upon the predetermined air flow rate and a to-be-maintained mass ratio between the air and fuel. Together with the conduit 16, 28, respectively, each of the fuel metering devices 18 and 30 thus forms a mixture forming device for generating a mixture that is supplied to the respective supercharging turbine 20, 32 and then to the respective manifold 22, 34. By disposing the respective fuel metering device upstream of the supercharging turbine, an excellent homogenization of the mixture takes place in the supercharging turbine, wherein it is additionally advantageous for the homogenization to smooth the flow, which is pulsating in the series of opening intake valves downstream of the respective supercharging turbine, upstream of the supercharging turbine.

The controlling and/or regulation of the air-fuel ratio of the mixture flowing into the cylinder 4 takes place by adding varying amounts of fuel to the fresh air flowing through the two fuel metering devices 18 and 30, so that, for example, a rich mixture is present in manifold 22 and a lean mixture is present in manifold 34. For example, the rich mixture has an air-to-fuel ratio of 0.9 relative to the stoichiometric ratio and the lean air-fuel mixture has a ratio of 1.1 relative to the stoichiometric ratio. The rich mixture composition is advantageously at least as rich as the richest mixture necessary for driving. The lean air-fuel ratio is advantageously at least as lean as the leanest mixture necessary for operation.

The adjustment of the air-fuel ratio inside of the cylinder takes place by means of control valves 26 and 38, which are disposed directed in front of the respective intake valves 27, 39 and which determine the quantity ratio and preferably also the quantity of the air-fuel mixture flowing into the cylinder during one intake stroke. If the same quantities flow in, the air-fuel ratio in the cylinder is 1 in the described example. If only rich mixture flows in, it is 0.9; if only lean mixture flows in, it is 1.1.

An electronic control device 44 serves to control the fuel metering valves 40 and 42 as well as the control valves 26 and 28; the electronic control device 44 comprises a microprocessor having program-memory and data-memory in a known manner. Inputs 46 of the electronic control device are connected with sensors that supply signals relevant for the quantity and the composition of the air-fuel mixture to be fed into the cylinders. Output signals are generated at the outputs 48 from these signals for actuating the fuel metering valves 40 and 42 and the control valves 26 and 38, wherein the control valves 26 and 38 are actuated in a cylinder-selective manner.

The actuation of the fuel metering valves 40 and 42 as well as the control valves 26 and 38 takes place in a controlled manner or in a regulated manner with use of feedback by supplying the signals from the exhaust gas sensors 48 and 50, which determine, e.g., the oxygen content in the exhaust gas, to the inputs 46 of the control device 44.

In the illustrated example, the conventional intake valves, which directly abut on the combustion chamber, can be actuated in a purely mechanical manner by the crankshaft via a camshaft as well as, if desired, a phase controller, so that the opening time and stroke range of the intake valves does not change in dependence on the load, but rather, if desired, are only shifted in the phase relative to the crankshaft.

Figure 2:
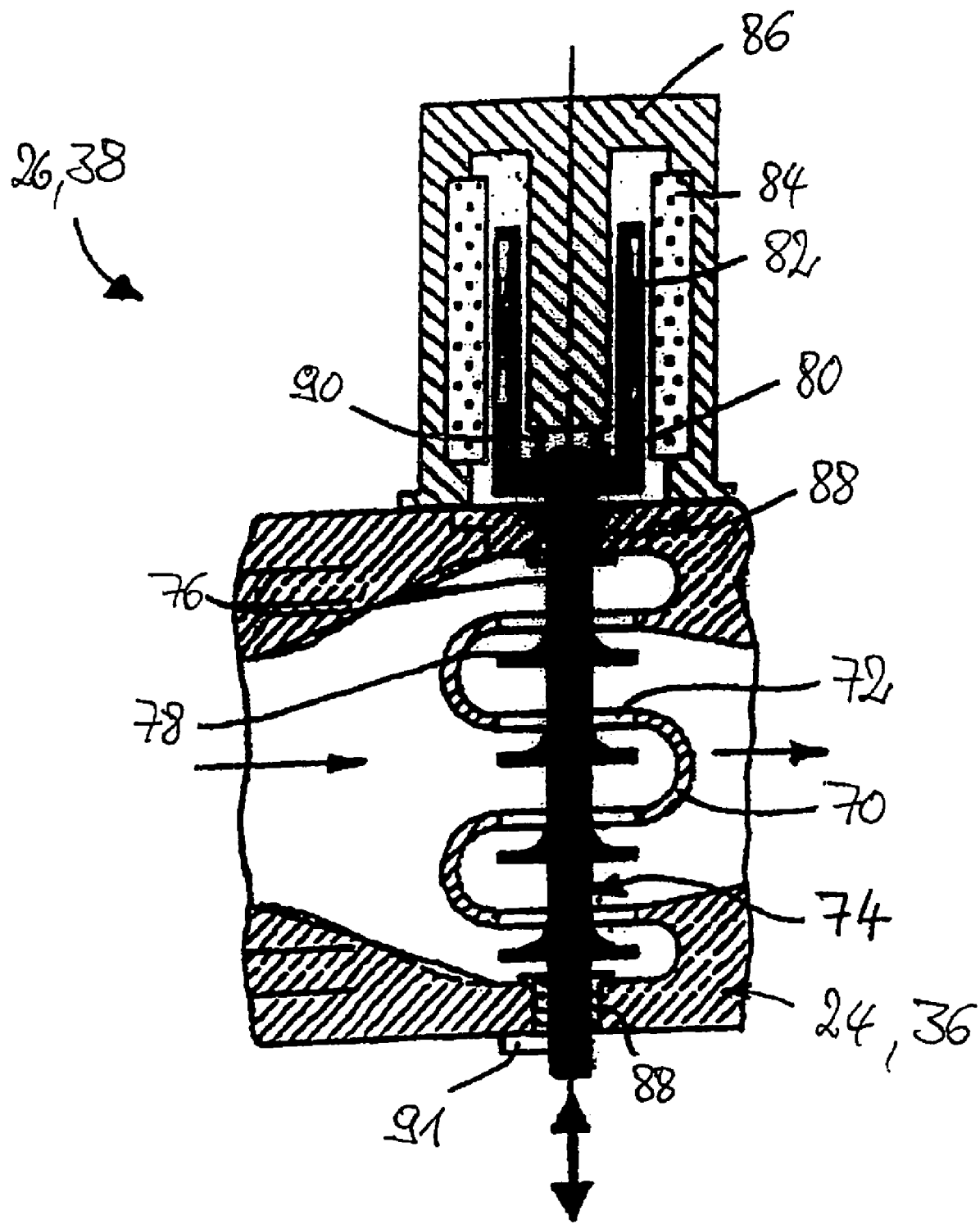
FIG. 2 shows a principle sectional view of a control valve employable in the internal combustion engine according to FIG. 1.

The control valve 26 and 38 are advantageously constructed such that their opening time points and closing time points, as well as if desired their opening stroke range, can be freely controlled. FIG. 2 shows a section through an exemplary control valve 26, 38, respectively.

The individual cylinder intake pipe 24, 36, respectively, leading to the cylinder includes a dividing wall 70, which is meander-shaped in the longitudinal cross-section through the intake pipe; four valve openings 72 are formed in the dividing wall 70 transverse to the axial direction of the intake pipe in the illustrated example. A valve member denoted as a whole with 74 extends transversely through the intake pipe and through the valve openings; the valve member 74 includes a shaft 76 and disks 78 surrounding the shaft 76 and rigidly attached thereto. The arrangement is such that, in the opened position of the valve, which open position is illustrated in FIG. 2, the uppermost and third-from-the-uppermost disks 78 are located downstream of the associated valve openings 72 with reference to the intake flow through the intake pipe; the two other disks 78 are located upstream of the associated valve openings 72. The diameter of the disks 78 corresponds approximately to the diameter of the valve openings 72, so that the valve is closed when the shaft 76 together with the disks 78 according to FIG. 2 have moved so far upwards that the disks 78 are located inside the openings 72. The disks 78 are advantageously formed in an aerodynamic manner.

The shaft 76 includes a cylindrical extension 80 outside of the intake pipe for actuation of the control valve; a coil 82 is accommodated in the extension 80 and is encircled by an electromagnet 84 that is accommodated in a housing 86 attached to the intake pipe.

The shaft 76 is longitudinally displaceably guided in the intake pipe within bushings 88. The cylindrical extension 80 is designed such that the stroke movement of the shaft 76 and/or the valve member 74 is limited on the one side by its abutment on the outer side of the intake pipe and on the other side by its abutment on an extension of the housing 86 protruding into it.

A spring 90 urges the valve member 74 into its opened position.

The function of the described control valve is as follows:

The coil 82 is connected to the control device 44. The valve is normally opened due to the force of the spring 90. By applying current to the coil 82, the valve member according to FIG. 2 will be moved upwardly into a position, in which the disks 78 are located inside of the valve openings 72 and close these openings 72. As is apparent, in the closed position of the valve, when for example a positive pressure prevails on the left side of the valve, this positive pressure acts on the uppermost and the third-from-the-uppermost disks such that the valve member is pressed downwardly, whereas the positive pressure acts on the lowermost and the third-from-the-lowermost disk such that the valve member is pressed upwardly, so that the valve member as a whole is not influenced by forces independent of the pressure difference.

An advantage that is achieved with the depicted valve is that it is movable in an extraordinarily rapid manner from the closing position into the opening position and vice versa, so that a precise control of the timings is possible with the lowest possible current wastage.

In the preferred, illustrated embodiment, the shaft 76 acts together with a position path sensor 91, which supplies information concerning the exact instantaneous position of the shaft 76 and thus of the disks 76. The control device 44 regulates the current through the coil 82 such that the actual position of the valve body 76, 78 at each time point corresponds to the target position, which is programmed and predetermined by the control device. As a result, not only the opening time point and the closing time point of the control valve can be freely controlled, but also its stroke range.

When the mixture quantities flowing into the cylinder are exclusively controlled by the stroke of the control valves 26 and 38 and their opening time point and closing time point are the same, a very homogenous composition of the mixture especially results in the combustion chamber. When the flow volumes are influenced by the engine valve timings of the control valves, more intense stratified charging effects can also be achieved by letting the lean mixture flow in temporarily before the rich mixture.

The described control valves are known from European Patent No. 1 236 875 B1. They can not only be utilized for controlling the quantity and thereby also the composition of the mixture in the combustion chamber, but also for a further reduction of the charge changing loses in the partial load range by using the partial load resonance charging described in this publication.

The invention can be modified in various ways.

For example, the turbochargers are not necessary and the invention can also be employed in naturally-aspirated engines. For turbo-engines, both turbochargers can be powered by one common exhaust gas turbine, through which the entire exhaust gas of the internal combustion engine flows. Further, externally-powered superchargers can also be utilized.

The control valves 26 and 38 are not necessarily required. The controlling of the quantity and of the composition of the mixture flowing into the cylinders can also be controlled by an appropriate design of the intake valves 27, 39, which directly abut on the combustion chamber. Further, it is possible to replace the control valves with throttle valves contained in the individual cylinder intake pipes and to open these throttle valves in an appropriate manner. Also, the individual throttle valves are not necessarily required. They can be each replaced with a throttle valve in the conduits 16 and 28.

The control valves can have a different construction than depicted; for example, they can be formed as rotating disk valve, whose opening cross-section can be changed by means of a stepping motor with respect to opening-beginning and closing-beginning as well as with respect to opening cross-section.

The mixture composition in the manifold 22 and in the manifold 34 can be changed during operation. For example, the lean mixture can be set to infinitely lean (no fuel metering). It is thereby possible, during suitably set engine valve timings of the control valves during the first phase of the intake, during which the intake valves overlap, to connect the cylinder combustion chamber exclusively with the individual cylinder intake pipe that is supplying pure air and then subsequently to direct the mixture into the cylinder through the other intake pipe. As a result, an overflow of mixture and/or fuel into the exhaust tract can be prevented during the valve overlapping phase of the main valves.

In summary, the invention offers multiple possibilities for improving the operational performance with regard to torque development and power development, operational efficiency and exhaust gas quality. The invention is particularly suitable for usage in gas motors, into which combustible gas is fed via fuel metering valves 40 and 42.

Reference Number List

4 Cylinder
6 Exhaust gas turbine
8 Exhaust gas turbocharger
10 Exhaust gas turbine
12 Exhaust gas turbocharger
14 Air filter
16 Conduit
18 Fuel metering device
20 Supercharging turbine
22 Manifold
24 Individual cylinder intake pipe
26 Control valve
27 Intake valve
28 Conduit
30 Fuel metering device
32 Supercharging turbine
34 Manifold
36 Individual cylinder intake pipe
38 Control valve
39 Intake valve
40 Fuel metering valve
42 Fuel metering valve
42 Electronic control device
46 Inputs
48 Outputs
70 Dividing wall
72 Valve opening
74 Valve member
76 Shaft
78 Disk
80 Extension
82 Coil
84 Electromagnet
86 Housing
88 Bushing
90 Spring
91 Position path sensor

The invention claimed is:

1. A method for controlling a composition of a combustible air-fuel mixture present in a combustion chamber of a spark-ignited internal combustion engine, the method comprising:

generating external to the combustion chamber at least a first fluid with a first air-fuel ratio and a second fluid with a second air-fuel ratio, the first fluid being generated independently of the second fluid and having a different air-fuel ratio than the second fluid, wherein each air-fuel ratio is settable and maintainable at any value, regardless of the respective fluid flow rates of the first and second fluid, and generating an air-fuel mixture having a predetermined composition in the combustion chamber by controlling a proportional quantity of each of the first and second fluid that is supplied into the combustion chamber shortly before or upon entering the combustion chamber so that the first and second fluids are first mixed together in the combustion chamber.

2. A method according to claim 1, further comprising controlling the proportional quantity of the first and second fluids flowing into the combustion chamber by at least one of changing an opening duration and changing an opening timing of respective first and second control valves allocated to the first and second fluids, respectively, which control valves are disposed in corresponding inlets leading into the combustion chamber.

3. A method according to claim 2, wherein the first fluid is a rich air-fuel mixture and the second fluid is a lean air-fuel mixture, wherein the rich air-fuel mixture has a predetermined fuel content that is higher than the air-fuel mixture having the predetermined composition and the lean air-fuel mixture has a predetermined fuel content that is lower than the air-fuel mixture having the predetermined composition.

4. A method according to claim 2, wherein a fluid that is free of fuel as supplied into the combustion chamber as the sole fluid during a time period, in which at least one intake valve and at least one exhaust valve of the combustion chamber are simultaneously opened.

5. A method according to claim 1, wherein the fuel is a combustible gas.

6. A method according to claim 1, wherein the first fluid is a rich air-fuel mixture and the second fluid is a lean air-fuel mixture, wherein the rich air-fuel mixture has a predetermined fuel content that is higher than the air-fuel mixture having the predetermined composition and the lean air-fuel mixture has a predetermined fuel content that is lower than the air-fuel mixture having the predetermined composition.

7. An apparatus for controlling a composition of a combustible air-fuel mixture supplied into a plurality of cylinders of a spark-ignited internal combustion engine, comprising:

a first mixture generating device for generating a rich air-fuel mixture having a first predetermined air-fuel ratio, a second mixture generating device for generating a lean air-fuel mixture having a second predetermined air-fuel ratio, the first and second mixture generating devices being external to the cylinders and the rich mixture having a higher fuel proportion than the lean mixture, wherein each air-fuel ratio is settable and maintainable at any value, regardless of the respective flow rates of the first and second fluid, a first manifold having a plurality of individual intake pipes configured to supply the rich mixture to a plurality of first intakes respectively leading into the plurality of cylinders, a second manifold having a plurality of individual intake pipes configured to supply the lean mixture to a plurality of second intakes respectively leading into the plurality of cylinders, a first valve device disposed in each of the first intakes and configured to control the quantity of the rich mixture supplied to the respective cylinder, a second valve device disposed in each of the second intakes and configured to control the quantity of the lean mixture supplied to the respective cylinder, and a control device for controlling the first and second valve devices such that the sum of the quantities of the rich mixture and the lean mixture flowing into the respective cylinders results in a mixture having a predetermined composition.

8. An apparatus according to claim 7, wherein the control device is configured to control the valve devices in at least one of a cylinder-selective manner and a cycle-selective manner.

9. An apparatus according to claim 7, wherein each of the first and second valve devices includes an intake valve directly abutting on the cylinder and a control valve that is controllable, independent of the intake valve, with respect to at least one of an opening timing, a closing timing and an opening cross-section thereof.

10. An apparatus according to claim 7, wherein each of the first and second valve devices includes an intake valve directly abutting on the cylinder, at least one of an opening timing, a closing timing and an opening cross-section of the intake valve being controllable.

11. An apparatus according to claim 9, wherein the control device is configured to control the controllable valves so they have the same engine valve timings and different valve stroke ranges.

12. An apparatus according to claim 9, wherein the control device is configured to control the controllable valves with unequal engine valve timings.

13. An apparatus according to claim 7, wherein each of the first and second mixture generating devices includes a fuel metering device that is arranged upstream of a compressor.

14. An apparatus according to claim 13, wherein a first compressor is disposed between a first fuel metering device and the first manifold and a second compressor is disposed between a second fuel metering device and the second manifold, each compressor being configured to be driven by at least one exhaust turbine that is driven by the exhaust gas of the internal combustion engine.

15. An apparatus according to claim 9, wherein at least one control valve includes:

a valve member having a shaft actuatable by an electromagnet configured to control an opening and a closing of the control valve, and at least two closing members rigidly connected with the shaft, the closing members cooperating with associated valve openings located in a dividing wall of an individual intake pipe such that pressure differences acting on opposing sides of the closing members do not influence the valve member.

16. An apparatus according to claim 15, wherein:

the shaft transversely penetrates through the individual intake pipe and is longitudinally movable by means of the electromagnet, and the dividing wall is meander-shaped, and the closing members are constructed as disks surrounding the shaft, the disks being disposed such that, in the opened state of the control valve, the disks are arranged on different sides of the valve openings with respect to the direction of the fluid flow through the respective intake pipe.

17. An apparatus according to claim 16, wherein the dividing wall has four valve openings and the shaft has four corresponding disks configured to open and close the respective valve openings.

18. An apparatus for controlling a composition of a combustible air-fuel mixture present in a combustion chamber of a spark-ignited internal combustion engine, the apparatus comprising:

first means for generating at least a first fluid and a second fluid external to the combustion chamber, the first means generating the first fluid independently of the second fluid and such that the first fluid has a different air-fuel ratio than the second fluid, the first means being configured such that each air-fuel ratio is settable and maintainable at any value, regardless of the respective fluid flow rates of the first and second fluid, and second means for generating an air-fuel mixture having a predetermined composition in the combustion chamber by controlling the a proportional quantity of each of the first and second fluid that is supplied into the combustion chamber shortly before or upon entering the combustion chamber so that the first and second fluids are first mixed together in the combustion chamber.

19. An apparatus according to claim 18, wherein the first means is configured such that the first fluid is a rich air-fuel mixture and the second fluid is a lean air-fuel mixture, the rich air-fuel mixture has a predetermined fuel content that is higher than the air-fuel mixture having the predetermined composition and the lean air-fuel mixture has a predetermined fuel content that is lower than the air-fuel mixture having the predetermined composition.

20. An apparatus according to claim 19, wherein the second means comprises:

a first manifold having a plurality of individual intake pipes configured to supply the rich mixture to a plurality of first intakes respectively leading into a plurality of combustion chambers of the spark-ignited internal combustion engine, a second manifold having a plurality of individual intake pipes configured to supply the lean mixture to a plurality of second intakes respectively leading into the plurality of combustion chambers of the spark-ignited internal combustion engine, a first valve device disposed in each of the first intakes and configured to control the quantity of the rich mixture supplied to the respective combustion chamber, a second valve device disposed in each of the second intakes and configured to control the quantity of the lean mixture supplied to the respective combustion chamber, and a control device for controlling the first and second valve devices such that the sum of the quantities of the rich mixture and the lean mixture flowing into the respective combustion chambers results in the air-fuel mixture having the predetermined composition.

\* \* \* \* \*